(12) United States Patent
Hesler

(10) Patent No.: US 6,936,645 B2
(45) Date of Patent: Aug. 30, 2005

(54) METHOD OF FINISHING A DRYWALL AND A COMPOUND THEREFOR

(75) Inventor: Travis Hesler, Biloxi, MS (US)

(73) Assignee: DWC, LLC, Grand Bay, AL (US)

( * ) Notice: Subject to any disclaimer, the term of this patent is extended or adjusted under 35 U.S.C. 154(b) by 178 days.

(21) Appl. No.: 10/346,155

(22) Filed: Jan. 16, 2003

(65) Prior Publication Data

US 2003/0106468 A1 Jun. 12, 2003

Related U.S. Application Data

(62) Division of application No. 09/941,041, filed on Aug. 28, 2001, now Pat. No. 6,569,497.

(51) Int. Cl.[7] .................................................. C08L 3/00
(52) U.S. Cl. ............................... 524/8; 524/2; 524/582; 524/584; 428/401
(58) Field of Search ........................... 524/582, 584, 524/8, 2, 425, 451; 428/401

(56) References Cited

U.S. PATENT DOCUMENTS

| | | | | |
|---|---|---|---|---|
| 3,891,582 A | | 6/1975 | Desmarais | |
| 4,039,492 A | * | 8/1977 | Hamilton | 524/26 |
| 4,404,314 A | * | 9/1983 | Jabloner | 524/519 |
| 5,079,042 A | * | 1/1992 | Frings | 427/403 |
| 5,277,712 A | * | 1/1994 | McInnis | 106/774 |
| 6,238,476 B1 | | 5/2001 | Sprinkle | |
| 6,295,794 B1 | | 10/2001 | Nordt et al. | |

* cited by examiner

*Primary Examiner*—David W. Wu
*Assistant Examiner*—Rip A Lee
(74) *Attorney, Agent, or Firm*—Keaty Professional Law Corporation

(57) ABSTRACT

The method for sealing a seam between adjacent structural panels significantly reduces the time for finishing a drywall in comparison with conventional methods, which use multiple applications of a joint compound to seal the seam. An drywall joint compound is mixed with a synthetic fiber, such as Colombian Fiber, or polypropylene, and sufficient water to facilitate soaking of the synthetic fiber and mixing with the joint compound. An optional liquid adhesive, such as liquid liquid adhesive for vinyl wallpaper, or water-based liquid adhesive, is added to the mixture. The mixture is then applied as one coat to the seam and allowed to dry. No subsequent coatings of the mixture are necessary.

5 Claims, 1 Drawing Sheet

---

MIXING A DRYWALL JOINT COMPOUND WITH WATER, SYNTHETIC FIBER AND LIQUID WALLPAPER ADHESIVE

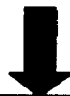

APPLYING THE MIXTURE TO DRYWALL JOINTS

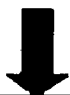

ALLOWING MIXTURE TO DRY

```
┌─────────────────────────────────────────┐
│   MIXING A DRYWALL JOINT COMPOUND       │
│   WITH WATER, SYNTHETIC FIBER AND       │
│       LIQUID WALLPAPER ADHESIVE         │
└─────────────────────────────────────────┘
                    │
                    ▼
┌─────────────────────────────────────────┐
│    APPLYING THE MIXTURE TO DRYWALL      │
│                JOINTS                   │
└─────────────────────────────────────────┘
                    │
                    ▼
┌─────────────────────────────────────────┐
│         ALLOWING MIXTURE TO DRY         │
└─────────────────────────────────────────┘
```

FIGURE 1

METHOD OF FINISHING A DRYWALL AND A COMPOUND THEREFOR

CROSS-REFERENCE TO RELATED APPLICATIONS

This application is a divisional application of my application Ser. No. 09/941,041 filed on Aug. 28, 2001, now U.S. Pat. No. 6,569,497, entitled "A Method of Finishing a Drywall and a Compound Therefor," the full disclosure of which is incorporated by reference herein.

BACKGROUND OF THE INVENTION

This invention relates to drywall finishing, and more particularly to a method of reducing the time required to finish drywall joints and to a compound for sealing drywall joints.

The building industry widely uses gypsum board in the construction of residential homes, commercial buildings, and other structures. The gypsum board, also known as sheetrock or drywall is usually pre-cut in flat sheets of 4×8 or 4×12 foot, having a thickness of ½ or ⅝". The sheets of the gypsum board are hung on wood or metal studs to form an interior wall of the building. Typical walls have joints between the sheetrock segments that must be covered to form a smooth surface for application of the wallpaper or paint.

A conventional method of finishing the drywall comprises a number of steps. First, a drywall joint compound is deposited along the joint as a thin bead. The drywall joint compound usually has limestone, water, mica, vinyl acetate polymer and may also have talc. The limestone may be substituted by dolomite or gypsum. If the compound comes as a dry powder, it is mixed with the necessary amount of water, stirred and then applied with a six-inch joint finishing knife to the joint. Immediately after that, a drywall tape is placed over the bead of the drywall joint compound and the joint finishing knife is run over the tape to press the tape and cause it to adhere to the compound.

The first coat of the compound with the tape is allowed to dry for 24 hours. Then a second coat of the joint compound is applied over the first coat to cover the tape completely and to cover the interface between the tape and the wall. The second coat is allowed to dry for 24 hours. Then a third coat is applied with a 10-inch joint finishing knife to make a wide strip of the joint compound on the wall that would entirely cover the tape as well as the first two coats. When the final coat dries, again for about 24 hours, it is sanded to remove imperfections and achieve a smooth finish. The dust is wiped off or blown off to make the wall ready for wallpaper or paint application.

The disadvantage of the conventional method is that it requires 3–4 days to finish one wall, with a 24-hour drying period between joint compound applications. The drywall finisher has to come back to the same job several times before the walls are finished. The time spent on finishing the walls directly translates into the cost of the building construction. It would be therefore a considerable advantage to provide a method that would reduce the labor time in finishing the drywall and thereby reduce the overall cost of construction.

The present invention contemplates provision of such a method and a novel compound for finishing a drywall that would reduce the curing time and eliminate the need for multiple joint compound applications.

SUMMARY OF THE INVENTION

It is, therefore, an object of the present invention to provide a method of finishing a drywall by eliminating the number of coats necessary to finish a drywall.

It is another object of the present invention to provide a drywall joint compound that has reduced curing time and is strong enough even with one application.

These and other objects of the present invention are achieved through the provision of a method of finishing a drywall, which includes the steps of mixing an drywall joint compound with a predetermined amount of water and a synthetic fiber, such as Colombian fiber. An optional liquid wallpaper adhesive may be added to the mixture. The mixed compound is then applied to the joint between the drywall sheets and allowed to dry for 24 hours. No further applications of the compound are necessary. The drywall joint becomes sealed with a smooth, strong seal.

The composition of the present invention contains between about 97.68% to about 98.8% of sheetrock compound, between about 0.247% to about 0.97% of water, between about 0.494% to about 0.73% of synthetic fiber, and between about 0.73% to about 0.61% by weight of the vinyl adhesive. The adhesive is selected from the family of vegetable adhesives.

The presence of the synthetic fiber reduces the chance of the joint cracking, making the sealed joint somewhat "flexible." At the same time, the joint seal is stable, capable of withstanding settling of the house, while preserving the even, smooth surface for the application of a wallpaper or paint. The same compound may be used for repairing the drywall and covering holes or punctures in the wall. The compound of the present invention eliminates the need for mesh fabric, which is conventionally used when repairing a drywall.

BRIEF DESCRIPTION OF THE DRAWINGS

Reference will now be made to the drawing illustrating the method steps of the present invention, wherein FIG. 1 is a flow chart of the preferred embodiment of the method of finishing a drywall according to the present invention.

DETAILED DESCRIPTION OF THE PREFERRED EMBODIMENT

The method of the present invention begins with preparing a compound for sealing the drywall joints. The user deposits a predetermined amount of finely chopped synthetic fiber, such as Colombian fiber, into a container with an joint compound and pours water over the fiber. The synthetic fiber consists of polypropylene fibers.

The synthetic fiber is chopped into segments of ½ to 1" in length and diameter equal to the diameter of human hair. The fiber is allowed to soak for 1–3 minutes. The Colombian fiber soaks up the water in the joint compound while the limestone, gypsum, clay and other ingredients in the standard joint compound adhere to the fibers. The mixture is then vigorously agitated for 2–5 minutes and a liquid vinyl wallpaper adhesive is added.

A thoroughly mixed mixture is then applied to the drywall joints, taking care to fill the entire joints with an even bead. The operator then smoothes the deposited coat on both sides of the joints with a joint finishing knife. The mixture is then allowed to dry for about 24 hours, after which time the wall is ready for application of the paint or wallpaper.

In the preferred embodiments the sheetrock compound is selected from a group of conventional joint compounds. Such compounds are manufactured by a number of companies in the United States, such as Gypsum Company of Chicago, Ill., National Gypsum Company of Shamrock, N.C., and others. The manufacturer may use limestones, dolomite or gypsum as the main ingredient. Additional ingredients may include plaster of Paris, perlite, vinyl acetate polymer, mica (silicates of chemical compositions), hydrated aluminum silicates (attapulgite clay), starch, crystallized silicone dioxide (quartz), water and latex.

The synthetic fiber used in the preferred embodiment of the present application is the so-called Colombian Fiber. This ingredient is readily available on the market; it is white and has a specific gravity of 0.91. The synthetic fiber is polypropylene fiber, which is chopped into to ½ inch to 1 inch in length pieces and broken up into fibers having a diameter equal to approximately the diameter of the human hair. The liquid adhesive for vinyl wallpaper, or water-based liquid adhesive used in the composition of the present invention is readily available on the market from, for instance, Roman Adhesive, Inc. of Illinois. The adhesive has a vegetable base. It is translucent and has a specific gravity of 1.1. It is miscible in water in all proportions.

The preferred embodiment of the present invention provides for a composition comprising from about 97.68% to about 98.8% of sheetrock compound, from about 0.247% to about 0.97% of water, from about 0.494% to about 0.73% of synthetic fiber, and from about 0.37% to about 0.61% by weight of the liquid adhesive. The adhesive is selected from the family of vegetable adhesives.

The method of the present invention using the novel compound allows to significantly reduce the finishing time for drywalls. Usually, one coat of the compound is sufficient to cover the joint in a smooth bead of coating along the joint line and on both sides thereof. The second and third coat is not necessary. If desired, a finishing coating may be applied to the dried compound of the present invention to cover any possible imperfections created when applying the coat with the joint knife.

The present invention provides a method of reducing the labor time when finishing a drywall, eliminates multiple coatings of the joint with a joint compound, as well as dry-sanding of the final coat of the joint compound. The present invention thus allows to significantly reduce the time for finishing the drywall and avoid any possible hazards from the dust created when the walls are sanded. The Colombian fiber soaks up the water in the joint compound while the limestone, gypsum, clay and other ingredients in the standard joint compound adhere to the fibers.

The joint compound of the present invention may be successfully used for repairing cracks or holes in the sheetrock wall without the need for mechanical devices that are conventionally used for covering the cracks or holes before the joint compound can be applied. It is envisioned that the compound of the present invention may be also used for repairing seams and other areas of a building where a smooth, crack-free surface is desired.

Due to the presence of synthetic fiber in the compound, the finished wall will not crack along the interface of the gypsum board sheets. The synthetic fiber allows for relative "flexibility" of the seam created with the novel joint compound, which avoids the need for touching up the walls due to the settling of a building.

Many changes and modifications may be made in the method and compound of the present invention without departing from the spirit thereof. I therefore pray that my rights to the present invention be limited only by the scope of the appended claims.

I claim:

1. A composition, which forms a setting type homogenous drywall joint compound, comprising from about 97.68 to about 98.8 percent by weight of joint compound, a synthetic fiber comprising polypropylene soaked in water and mixed with the drywall joint compound to form a homogenous drywall joint compound, with the soaking water being present in a sufficient amount to facilitate mixing, in amounts ranging from about 0.247% to about 0.97% by weight of the composition.

2. The composition of claim 1, in which the synthetic fibers is present in amounts ranging from about 0.484 to about 0.73% by weight of the composition.

3. The composition of claim 1, wherein said synthetic fiber comprises polypropylene in segments having length from about 0.5 to 1 inches.

4. A composition, which forms a setting type homogenous drywall joint compound, comprising from about 97.68 to about 98.8 percent by weight of a drywall joint compound, a synthetic fiber comprising polypropylene soaked in water and mixed with the drywall joint compound to form a homogenous drywall joint compound and a liquid adhesive.

5. The composition of claim 4, in which the liquid adhesive is a liquid wallpaper adhesive present in amounts ranging from about 0.37 to about 0.61% by weight of the composition.

* * * * *